United States Patent
Farthing et al.

(10) Patent No.: US 7,328,629 B2
(45) Date of Patent: Feb. 12, 2008

(54) METHOD AND APPARATUS FOR MAINTAINING MULTI-COMPONENT SAMPLE GAS CONSTITUENTS IN VAPOR PHASE DURING SAMPLE EXTRACTION AND COOLING

(75) Inventors: William Earl Farthing, Pinson, AL (US); Larry Gordon Felix, Pelham, AL (US); Todd Robert Snyder, Birmingham, AL (US)

(73) Assignee: Gas Technology Institute, Des Plaines, IL (US)

( * ) Notice: Subject to any disclaimer, the term of this patent is extended or adjusted under 35 U.S.C. 154(b) by 229 days.

(21) Appl. No.: 11/112,360

(22) Filed: Apr. 22, 2005

(65) Prior Publication Data

US 2005/0236040 A1 Oct. 27, 2005

Related U.S. Application Data

(60) Provisional application No. 60/564,320, filed on Apr. 22, 2004.

(51) Int. Cl.
*G01N 1/38* (2006.01)
*G01N 1/42* (2006.01)
*G05D 11/02* (2006.01)

(52) U.S. Cl. .................. 73/863.11; 73/863; 436/179

(58) Field of Classification Search ..................
73/863.11–863.12, 863; 436/179; 137/87.01–88, 137/93
See application file for complete search history.

(56) References Cited

U.S. PATENT DOCUMENTS

| | | | | |
|---|---|---|---|---|
| 3,938,390 A * | 2/1976 | Grey | ........................ | 73/863.11 |
| 4,868,129 A * | 9/1989 | Gibbons et al. | ............. | 436/179 |
| 5,237,881 A * | 8/1993 | Ross | ........................ | 73/863.12 |
| 6,857,327 B2 * | 2/2005 | Silvis et al. | ............. | 73/863.11 |
| 7,051,604 B1 * | 5/2006 | Mayeaux | .................. | 73/863.12 |
| 7,063,097 B2 * | 6/2006 | Arno et al. | ................ | 137/93 X |
| 2003/0232449 A1 * | 12/2003 | Mikkanen et al. | ........... | 436/179 |
| 2007/0137314 A1 * | 6/2007 | Watson et al. | ................. | 73/863 |

* cited by examiner

*Primary Examiner*—Thomas P. Noland
(74) *Attorney, Agent, or Firm*—Mark E. Fejer

(57) ABSTRACT

An apparatus and method for diluting and cooling that is extracted from high temperature and/or high pressure industrial processes. Through a feedback process, a specialized, CFD-modeled dilution cooler is employed along with real-time estimations of the point at which condensation will occur within the dilution cooler to define a level of dilution and diluted gas temperature that results in a gas that can be conveyed to standard gas analyzers that contains no condensed hydrocarbon compounds or condensed moisture.

6 Claims, 5 Drawing Sheets

METHOD AND APPARATUS FOR MAINTAINING MULTI-COMPONENT SAMPLE GAS CONSTITUENTS IN VAPOR PHASE DURING SAMPLE EXTRACTION AND COOLING

CROSS REFERENCE TO RELATED APPLICATION

This application claims the benefit of Provisional U.S. patent application Ser. No. 60/564,320 filed 22 Apr. 2004.

The U.S. Government has a paid-up license in this invention and the right in limited circumstances to require the patent owner to license others on reasonable terms as provided for by the terms of Contract No. DE-FC36-03G0 13175 awarded by the U.S. Department of Energy.

BACKGROUND OF THE INVENTION

1. Field of the Invention

This invention relates to a method and apparatus for maintaining multi-component sample gas constituents of a gaseous process stream in vapor phase so as to enable on-line characterization of these streams. More particularly, this invention relates to a method and apparatus for reducing the pressure and/or temperature of a stream extracted from a high pressure and/or high temperature industrial process so that condensable constituents in the unconditioned gas stream remain in the vapor phase and can be evaluated by standard process control instrumentation. This invention also relates to a specialized sample gas dilution apparatus that has been designed and modeled to provide uniform, precise levels of sample gas dilution and/or cooling. Finally, this invention relates to a method for predicting when a sample gas stream has been sufficiently cooled and/or diluted so that additional cooling or dilution is not required to avoid condensation when the conditioned sample is conveyed to an appropriate gas analyzer.

2. Description of Related Art

Gaseous process streams, such as those produced by synthesis gas production processes (e.g. coal, biomass and waste gasification), typically contain a significant proportion of vapor phase hydrocarbon species with dew points, at ambient pressures or above, that range from ambient temperature to process temperature. These gaseous process streams are often obtained at elevated conditions of pressure and/or temperature that exceed the operating limits of instruments available to perform on-line characterizations of these streams. In cases where on-line analysis is deemed necessary, representative sample streams must be extracted from the process and their pressure and/or temperature reduced to levels acceptable for these instruments. For some applications, difficulties and uncertainties in modifying the sample streams to conditions acceptable to on-line analyzers result in reliance on batch analyses performed on purposely condensed samples that are collected for remote laboratory analysis. Although batch sampling followed by remote analysis is often a simpler approach, results are delayed, and in cases where portions of the collected sample may be lost or chemically altered during collection, storage, and laboratory analysis procedures, this approach also may not be quantitatively or qualitatively accurate.

One conventional method for conditioning high temperature and/or high pressure gaseous process streams for analysis by analytical instrumentation is the use of syngas sampling trains in which depressurized syngas is passed through liquid impingers to trap and condense essentially all of the vapor-phase components in a suitable liquid carrier for subsequent analysis. When impingers are employed, the hot process gas may need to be cooled before it can be passed to the impinger train. Direct-contact heat exchangers are typically employed for this purpose and directly precede the impinger train. They are designed so that effective, intimate contact of the hot gas with cooled surfaces is maintained. The inherent weakness in this approach for syngas conditioning emerges when the gas is cooled to a temperature that is below the local dew point of one or more of its constituents (the dew points of water and hydrocarbon vapors are primarily determined by their local partial pressure within a heat exchanger). At the moisture and hydrocarbon species concentrations commonly found in gasifier process streams, transitions through these dew points are always encountered as the synthesis gas is cooled to ambient temperature. Thus, when using this conventional approach, some constituents of the process gas stream will always condense. When a dew point is reached, the water and/or at least a portion of the hydrocarbon species (tars, oils) condense and collect on cool surfaces. This condensation can degrade the efficiency of the heat exchanger, create cleanup, maintenance, and health issues, and provide the opportunity for free radicals in the condensed vapors to react and change in structure and concentration before analyses can be carried out. These tars and oils can also be challenging to remove from sample lines and traps.

For on-line analyses of gaseous process streams, a significant reduction of the temperature of an extracted gas sample stream is often required because the upper temperature limit of the on-line instrument(s) is often well below the lowest process temperature. Likewise, the pressure of the extracted sample stream must often be significantly reduced before it can be safely conveyed to the analyzer. Conventional pressure-reducing valves or orifices are commonly used to reduce gas pressures, and conventional contact heat exchangers are frequently used to reduce gas temperatures. However, as a gas sample cools, the potential for the condensation of vapor-phase components increases, particularly when interior portions of the heat exchanger are locally cooler than the condensation temperature for one or more of the constituents of the gas sample. As previously indicated, depending on the process and the analytical instruments used to characterize the process, the loss of vapor-phase constituents by condensation can result in plugged sample lines, delayed or inaccurate measurements, and failure of the gas analyzers. For this reason, syngas analyses have generally been limited to batch sample extraction methods that include built-in traps or reservoirs for collecting condensed hydrocarbons.

Accordingly, it is apparent that a better approach is needed to manage sample gas conditioning of gasification process streams to avoid condensation so that standard gas analyzers can be employed to quantify the various components of these gases.

SUMMARY OF THE INVENTION

It is, thus, one object of this invention to provide a method and apparatus for enabling the on-line characterization of gaseous process streams, such as synthesis gas (syngas) streams from gasification processes.

It is one object of this invention to provide a method and apparatus for maintaining condensable constituents of multi-component sample gases in a vapor phase during sample extraction and cooling.

It is another object of this invention to provide a method and apparatus for managing the cooling and dilution of gas streams extracted from high-temperature industrial process streams so that condensable constituents in the extracted stream are maintained as a gas while it is cooled and diluted to an arbitrary temperature lower than that of the process stream.

It is a further object of this invention to provide an apparatus for uniformly diluting and/or cooling a gas stream extracted from a high temperature and/or high pressure industrial process.

It is another object of this invention to provide a method for determining the minimum level of cooling and/or dilution required to reach a specific final temperature while avoiding condensation in a depressurized gas stream extracted from a high temperature and/or high pressure industrial process.

These and other objects of this invention are addressed by a method and apparatus for cooling, diluting, and depressurizing gas streams that are extracted from a high-pressure and/or high temperature industrial process, which method and apparatus incorporate an inert pressure-letdown orifice, a specialized, inert dilution apparatus which uniformly dilutes and/or cools the hot gas stream with precise amounts of temperature-regulated inert gas, and a scheme for achieving the minimum level of dilution and/or cooling required to avoid the condensation of condensable constituents in the gas so that the depressurized, diluted, and cooled gas stream can be evaluated by standard gas analyzers such as FT-IR (Fourier Transform-Infrared) analyzers, gas chromatographs, and other instrumentation that cannot tolerate moist gases or gases that are intermingled with condensed species. One of the significant benefits of providing a condensate-free gas to a suite of gas analysis equipment is that it provides the ability to assess the performance of high-temperature and/or high pressure industrial processes on a real-time basis so that process efficiency and economy can be suitably controlled.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed and claimed herein is a method and apparatus for enabling real-time process control in high temperature and/or high-pressure processes where the evaluation of sample gases extracted from the processes has heretofore not been possible in real-time due to the difficulty in conveying a representative gas sample from the process to an appropriate analyzer. Currently, the only reliable approach that allows for the assessment of the effluent generated by high-pressure and/or high-temperature gasification processes is through laborious batch sampling procedures that attempt to collect all of the condensable constituents in a stream extracted from the process for subsequent laboratory analysis. Because the analyses of the condensed gas constituents must occur some time after the samples are collected, the opportunity exists for free radicals in the condensed vapors to react and change in structure and concentration before analyses can be completed. These tars and oils can also be challenging to remove from sample lines and traps. Thus, in order to manage high temperature and/or high-pressure industrial processes an approach is needed to provide for the real-time characterization of the gaseous effluents generated by these processes.

In accordance with one embodiment of the method and apparatus of this invention, high-pressure hot gas is expanded through an orifice so that it is decompressed and its volume is increased to provide for its swift conveyance downstream and to reduce the possibility of condensation because as gas is expanded, the partial pressures of condensable components in the gas are reduced. In order to avoid catalytic or chemical reactions between the syngas and the metal that forms the orifice (e.g. 310 or 316 stainless steel), the metal should be coated with an inert silica coating such as SILCOSTEEL. Likewise, metal tubes that are used to convey the sample and all valving and connectors through which the gas passes should be heated to as near process temperature as possible and should also be coated with a suitable inert material.

After the hot process gas has been expanded, it must be diluted and cooled before it can be accepted by standard gas analysis equipment. To avoid damaging downstream gas analyzers, the dilution and cooling step must be carried out so that condensation is avoided. Thus, a specially-designed dilution cooler has been engineered and modeled that provides uniform gas dilution and cooling from temperatures as high as 1100° F. to room temperature with dilution ratios near unity (no dilution, sample flow equal to sample plus dilution flow) to near 0.00001 with no cooled interior surfaces that can contact the sample gas. In practice, the maximum amount of dilution is limited by the accuracy of flow measurement.

Figure 1:
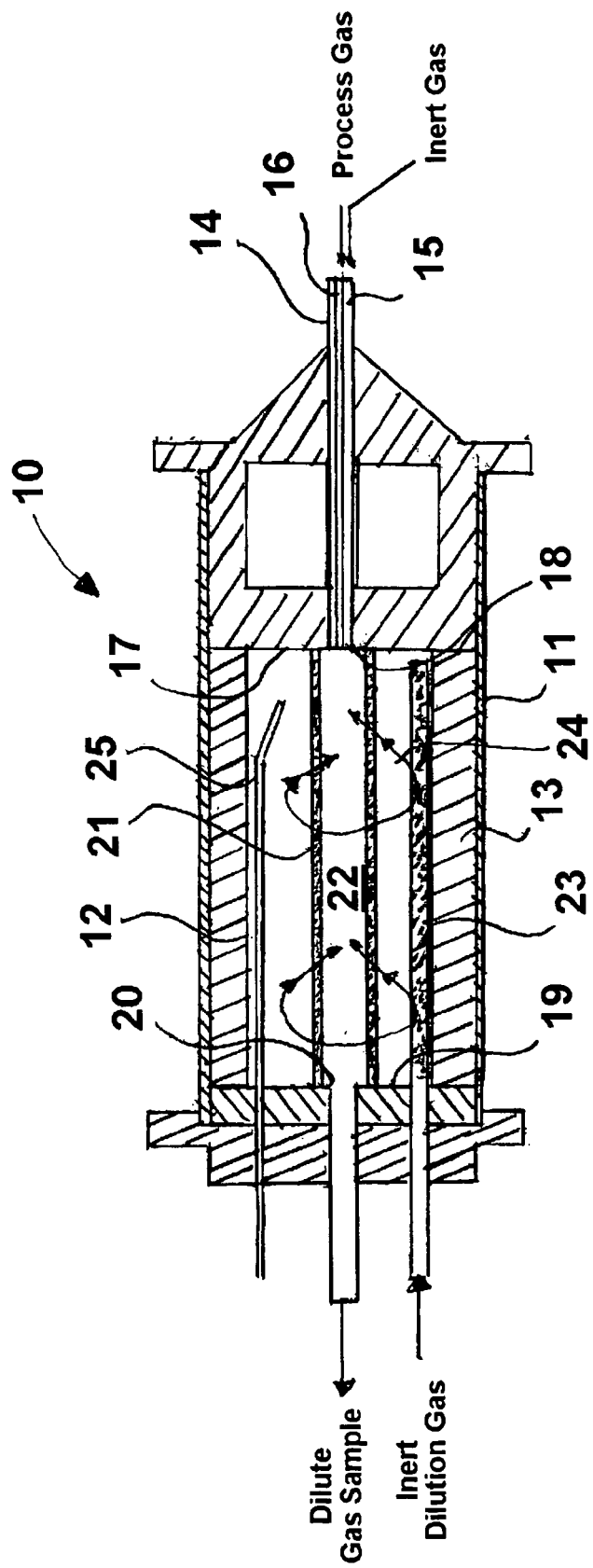
FIG. 1 is a lateral partial cross-sectional view of a dilution cooler for uniformly diluting and/or cooling a depressurized gas stream extracted from a high temperature and/or high pressure industrial process, such as a gasification process, in accordance with one embodiment of this invention.

The dilution cooler apparatus in accordance with one embodiment of this invention is shown in FIG. 1. It should be noted that, for simplicity, no external insulation is shown. The dilution cooler is preferably constructed of a heat-resistant, durable metal such as 310 or 316 stainless steel with interior surfaces preferably coated with an inert silica coating such as SILCOSTEEL to inhibit chemical or catalytic modification of the syngas.

As shown in FIG. 1, dilution cooler 10 comprises at least one wall 11 enclosing a dilution cooler chamber 12. The interior facing surface of wall 11 may be provided with a suitable insulating material layer 13. Dilution cooler chamber 12 comprises a sample gas inlet end 17 having a sample gas inlet opening 18 and an opposed dilute sample gas outlet end 19 having a dilute sample gas outlet opening 20. For introduction of the depressurized hot process gas stream (i.e. sample gas stream) into dilution cooler chamber 12, dilution cooler 10 further comprises a thermally insulated coaxial nozzle 14 having an outlet end disposed within sample gas inlet opening 18. In accordance with one preferred embodiment of this invention, the hot process gas is introduced through the central conduit 16 of the coaxial nozzle 14 into dilution cooler chamber 12 and a hot inert gas is introduced through the annulus 15 of the coaxial nozzle 14 into the dilution cooler chamber 12.

Disposed within dilution cooler chamber 12, and providing fluid communication between sample gas inlet opening 18 and dilute sample gas outlet opening 20 is a porous diffuser conduit 21 in which is disposed a mixing zone 22 in which the hot process gas is diluted and cooled by an inert dilution gas. The porous diffuser conduit 21 is preferably made of porous stainless steel with pore sizes suitable for imposing a low flow restriction on the inert dilution gas to ensure a uniform, slow addition of the inert dilution gas along the entire length of the porous diffuser conduit 21 into mixing zone 22. Thus, as the process gas stream passes through the porous diffuser conduit 21 from the sample gas inlet opening 18 to the dilute sample gas outlet opening 20, it is diluted by an ever increasing amount until it exits the dilution cooler chamber.

In accordance with one embodiment of this invention, the porous diffuser conduit is preferably made of a finely divided heat-resistant metal powder such as nickel, monel, inconel, hastelloy, or stainless steel formed into more or less spherical particles in the range of 1 to 100 micrometers in diameter, heat-resistant metals such as nickel, monel, inconel, hastelloy, or stainless steel that have been formed into fibers with diameters in the range from 1 to 100 micrometers and lengths in the range of 10 to 10000 micrometers, or a mixture of particles and fibers such as those described above that have been compacted and sintered into a rigid, self-supporting, permeable material with an average pore size of about 0.01 micrometers to about 100 micrometers and having an overall porosity (% open volume or equivalently % open area) greater than about 20%. In accordance with another embodiment of this invention, the porous diffuser conduit is made of a self-supporting perforated plate with each perforation no greater than about 100 micrometers with an open area of at least 75%. In yet another embodiment, the porous diffuser conduit is made from two components, a compacted, sintered array of fibers or spheres as described above that are supported on a woven or perforated metal mesh with an open area equal to or greater than 50% that is intimately associated with and permanently attached to the sintered array of fibers or spheres.

As shown in FIG. 1, an annular region 24 is formed within dilution cooler chamber 12 between the outer surface of porous diffuser conduit 21 and wall 11. Disposed within annular region 24 is an annular region porous diffuser tube 23 through which inert dilution gas is introduced into annular region 24 and ultimately through porous diffuser conduit 21 into mixing zone 22. Also disposed within annular region 24 is a means for measuring the temperature within dilution cooler chamber 12, for example, thermocouple 25.

Figure 2:
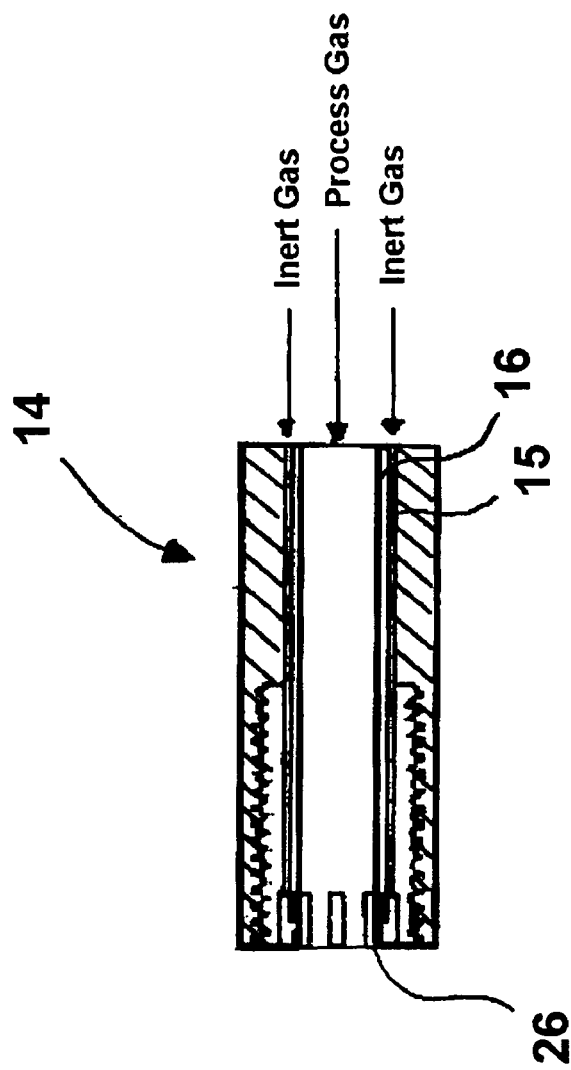
FIG. 2 is a cross-sectional view of a coaxial nozzle for introduction of the hot process gas stream into the dilution cooler in accordance with one embodiment of this invention.

In operation as shown in FIG. 1, hot, depressurized syngas enters from the right and discharges into the mixing zone within a thin, concentric, annular sheath of inert gas maintained at substantially the same temperature as the incoming syngas or process gas stream. In accordance with one preferred embodiment of this invention, the inert gases employed in the method and apparatus of this invention are selected from the group consisting of nitrogen, argon, helium, neon, krypton, xenon, and mixtures thereof. FIG. 2 shows details of one design for the coaxial nozzle 14. As shown therein, in accordance with one embodiment of this invention, the outlet end of the nozzle forms a plurality of bores 26, which are in fluid communication with the annulus 15. Although this design allows the inert gas to enter dilution cooler chamber 12 with no swirl, varying degrees of swirl can be incorporated by angling the bores with respect to the process gas outlet from the coaxial nozzle. To prevent abrupt cooling as the hot process gas enters the mixing zone, it first mixes with the hot, clean, inert, annular gas stream and then with additional inert gas (i.e. dilution/cooling gas) that enters the dilution cooler chamber 12 through annular region porous tube 23. This inert gas can enter the dilution cooler chamber at a temperature higher than, equal to, or lower than the temperature of the process gas stream and inert annular gas so that the process gas is diluted and cooled, diluted, or diluted and heated at the exit of the dilution cooler chamber. However, it is primarily meant to be used for dilution and cooling of process gas as opposed to dilution and heating.

To ensure that the dilution cooler has been properly designed, a two-dimensional version of a sophisticated computational fluid dynamic (CFD) model was used to develop a dedicated, executable computer model to examine the flow and mixing behavior of syngas and dilution gas within the dilution cooler. The model, which is available from the U.S. Department of Energy in connection with the above-cited DOE contract, is based on a real fluids version of a finite-difference Navier-Stokes CFD code for 2-D/3-D flow field simulations and analyses. This code enables the engineering analyses of general fluid dynamics problems and can be used to solve the 2-D planar, axisymmetric or 3-D forms of the Navier-Stokes equations and other scalar transport equations using primitive variables and general multi-zone, multi-block curvilinear coordinates. Compressible or incompressible, laminar or turbulent flow problems are solved using a pressure based predictor/multi-corrector solution algorithm. The code is a fully transparent and user friendly CFD code which has been used to analyze a wide variety of fluid dynamics related engineering problems (e.g. internal and/or external flows with complex geometries, cases with laminar or turbulent flow conditions, and flows with ideal, real or reacting gas effects for all speed ranges—incompressible to hypersonic flow regimes). This model in accordance with one embodiment of this invention incorporates the physical properties of a typical set of gases in a biomass-derived syngas mixture ($N_2$, $H_2O$, $CO_2$, $H_2$, CO, $CH_4$, Ar, $NH_3$) along with naphthalene ($C_{10}H_8$), as a surrogate tar, and calculates a variety of physical parameters (axial and radial gas velocity, temperature, pressure, component gas mass fraction and partial pressure) at each grid point within the mixing zone of the dilution cooler.

This CFD model has been used to intensively study the dilution of process gases by the dilution cooler of this invention and to explore the conditions under which condensation of moisture and a variety of hydrocarbon species would occur. Because tar species in diluted syngas comprise a very small portion of the gas, it is sufficient to utilize the CFD model with a syngas composed of $N_2$, $H_2O$, $CO_2$, $H_2$, CO, $CH_4$, Ar, $NH_3$ and $C_{10}H_8$ to determine the temperature and partial pressure of the syngas at each grid point within the mixing zone and then, knowing the physical properties of a number of hydrocarbon tars and oils typically found in biomass-derived syngas, determine where within the mixing zone anyone of these species would condense. Table 1 shows a typical process gas composition used for CFD model calculations and is followed by a listing of one set of flow rates and temperatures used for CFD model calculations.

TABLE 1

Syngas Composition

| Syngas Constituent | Molar Fraction |
| --- | --- |
| $H_2O$ | 0.1 |
| $H_2$ | 0.15 |
| $N_2$ | 0.4635 |
| $CO_2$ | 0.1 |
| CO | 0.15 |
| $CH_4$ | 0.03 |
| Ar | 0.005 |
| $NH_3$ | 0.001 |
| $C_{10}H_8$ | 0.0005 |

CFD Input Flow Rates and Temperatures

Syngas sample gas inlet flow rate=3 lpm at 1000° F. and atmospheric pressure $N_2$ sheath gas inlet flow rate=1 lpm, at 1000° F., with 0° swirl $N_2$ dilution gas inlet flow rate=11.4 lpm, at 100° F.

from the gasification of biomass. These results were calculated based on the Clausius-Clapeyron equation, used in the following form:

$$P = P_0 \exp\left[-\frac{\Delta H_{vap}}{R}\left(\frac{1}{T} - \frac{1}{T_0}\right)\right]$$

where:

T is absolute temperature, °K.

P is the equilibrium vapor pressure at temperature T, Pa $T_0$ is the boiling temperature, °K.

$P_0$ is the vapor pressure at the boiling temperature, 101325 Pa

R is the gas constant, 8314.51 J/(kmol•K)

$\Delta H_{vap}$ is the enthalpy of vaporization, J/kmol

Figure 3:
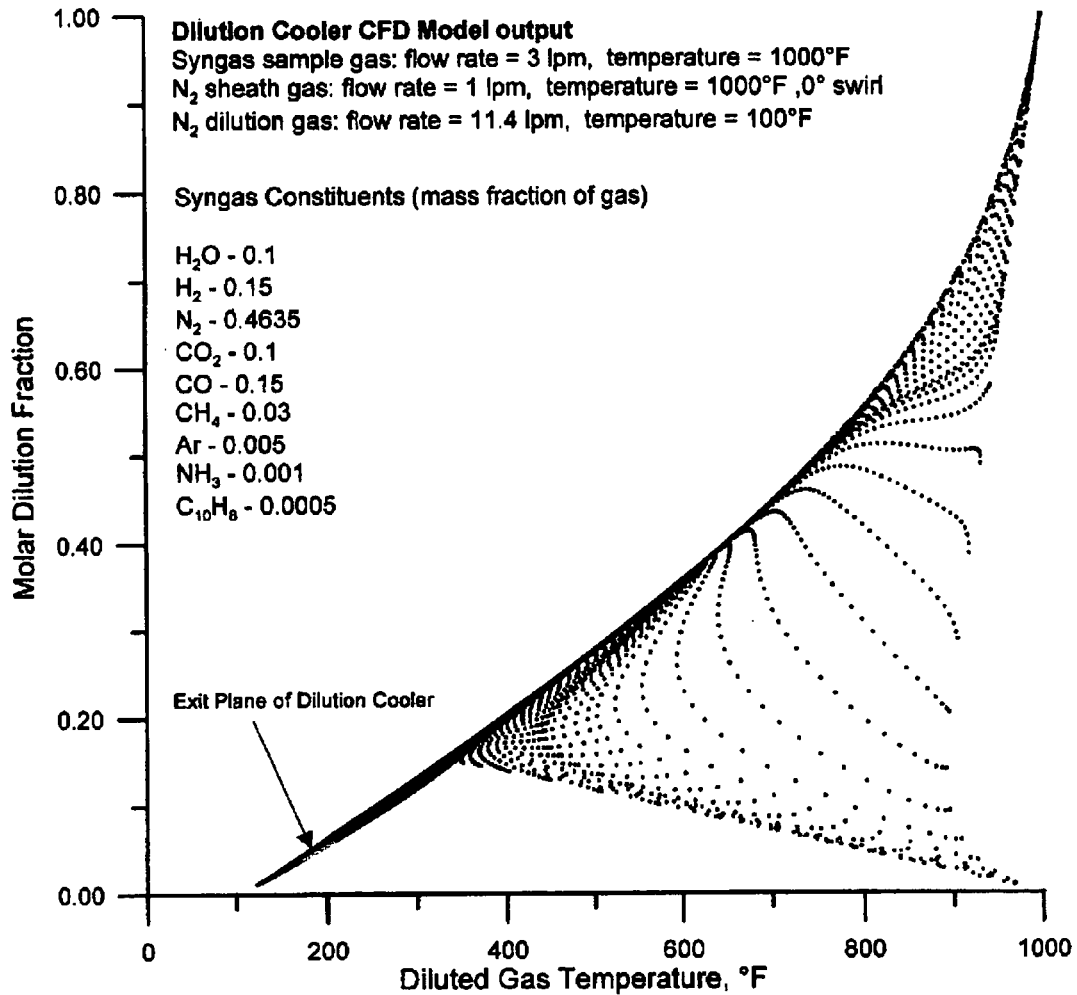
FIG. 3 is a diagram showing the output from the dilution cooler computational fluid dynamics (CFD) model showing molar fraction as a function of temperature.

Table 2 presents the parameters used in the above equation to predict the behavior shown in FIG. 3, along with estimates of the dilutions required to prevent these compounds from condensing when they are ultimately diluted to room temperature and pressure (20° C. and 1 atmosphere). As this table shows, for multi-ring hydrocarbons, condensation is difficult to avoid under these conditions.

TABLE 2

Representative Aromatic Compounds in Synthetic Fuel Gases and the Dilution Factors Required to Prevent their Condensation at Ambient Temperature and Pressure.

| Representative Compound | No. of Rings | Mass Fraction[a] | Mol. Wt. Kg/kmol[b] | Boiling Temp., °K[b] | Enth. Vap. MJ/kmol[b] | Mole Fr. in Gas, ppm | Part. Press. at Amb., Pa | Sat. Press. at 293 K, Pa | Dilution Required[d] |
| --- | --- | --- | --- | --- | --- | --- | --- | --- | --- |
| Benzene | 1 | 0.25 | 78.12 | 353 | 34.1 | 770 | 78 | 9450 | none |
| Naphthalene | 2 | 0.38 | 128.19 | 491 | 51.5 | 710 | 72 | 20 | ×14 |
| Naphthalene | 2 | 0.38 | 128.19 | 491 | 48.763[e] | 710 | 72 | 32 | ×9 |
| Phenanthrene | 3 | 0.13[f] | 178.24 | 613 | 59.3 | 175[f] | 18 | 0.31 | ×230 |
| Anthracene | 3 | 0.13[f] | 178.24 | 613 | 70.4 | 175[f] | 18 | 0.029 | ×2500 |
| Pyrene | 4 | 0.11 | 202.26 | 666 | 66.6[g] | 130 | 13 | 0.023 | ×2300 |
| Perylene | 5 | 0.04 | 252.32 | 68[h] | 64.8[g] | 38 | 3.9 | 0.048 | ×320 |
| Coronene | 7 | 0.02[i] | 300.36 | 798 | 79.8[g] | 16 | 1.6 | 0.00010 | ×62,000 |

[a]Total mass fraction of compounds in this class (1, 2, . . . , ≧ 6 rings) in oils from wood-derived gas. Average of values observed by Evans, Knight, Onischak, and Babu (1988, pp. 104-105).
[b]Weast and Astle, Handbook of Chemistry and Physics, 62nd ed., 1981, except as noted.
[c]Based on total oil concentration of 10 g/m³ at NTP (300° K, 101325 Pa).
[d]Dilution factor required to reduce the partial pressure at atmospheric pressure to ¼ of the saturation pressure at 293° K.
[e]Enthalpy determined using selected vapor pressure data from Perry, Green, and Maloney, Perry's Chemical Engineers' Handbook, 6th ed., 1984, p. 3-58, to test the sensitivity to uncertainty in the value for the enthalpy.
[f]Either phenanthrene or anthracene used as representative of 3-ring compounds, to assess sensitivity to enthalpy of vaporization.
[g]Estimated using analogue of Trouton's Rule, $\Delta H_{vap}/T_{bp} = 100,000$ J/(kmol · K).
[h]Sublimes, 623-673° K.
[i]Mass fraction of aromatic hydrocarbons containing six or more rings.

FIG. 3 shows the range of temperatures predicted by the model at each grid point within the mixing zone and at the exit plane of the dilution cooler. As might be expected, with 100° F dilution gas, the exit temperature is slightly greater than 100° F. but these data also show that temperatures within the mixing zone can be locally lower than those found at the exit.

Figure 4:
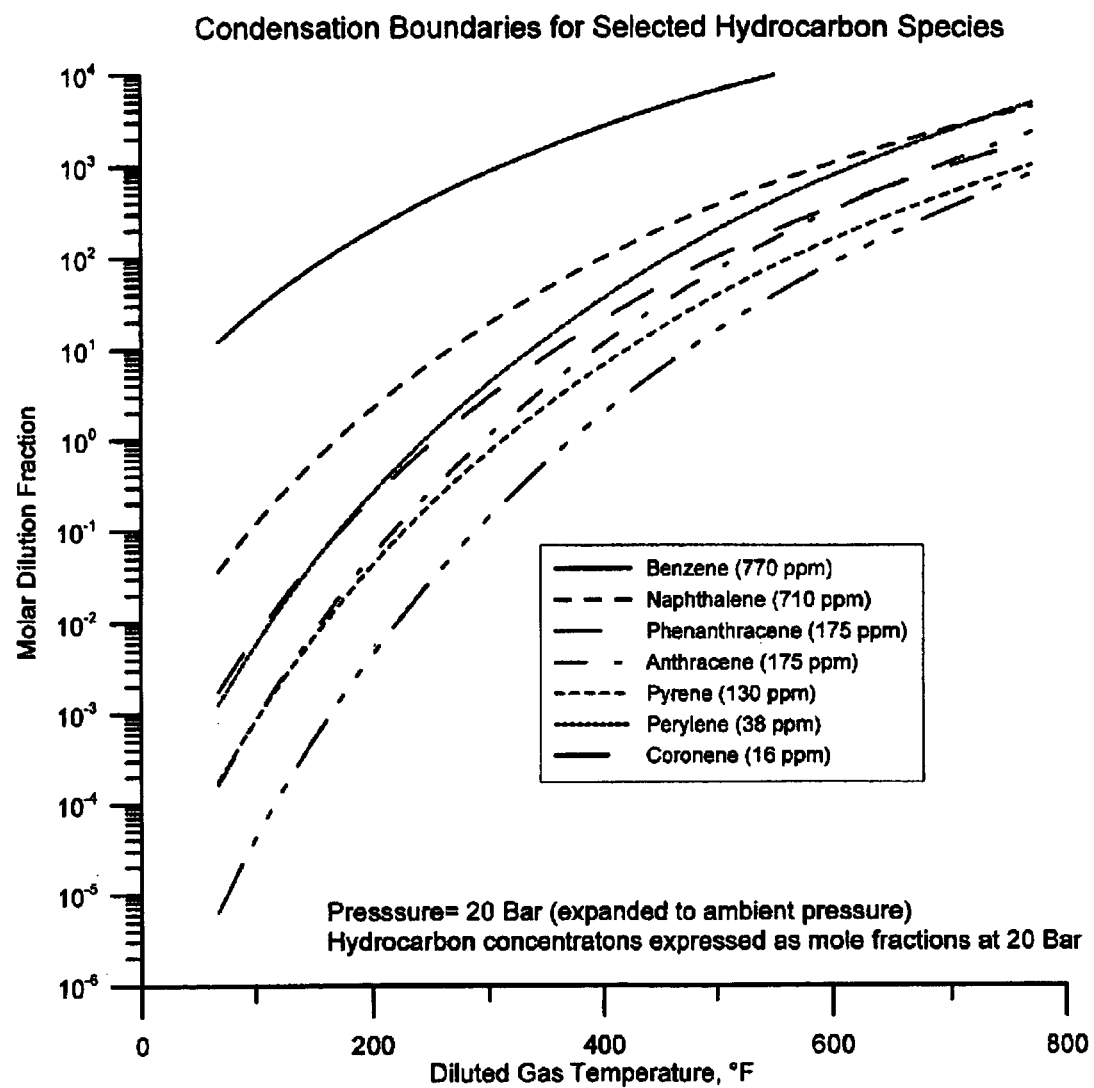
FIG. 4 is a diagram showing condensation boundaries for selected hydrocarbon species.
Figure 5:
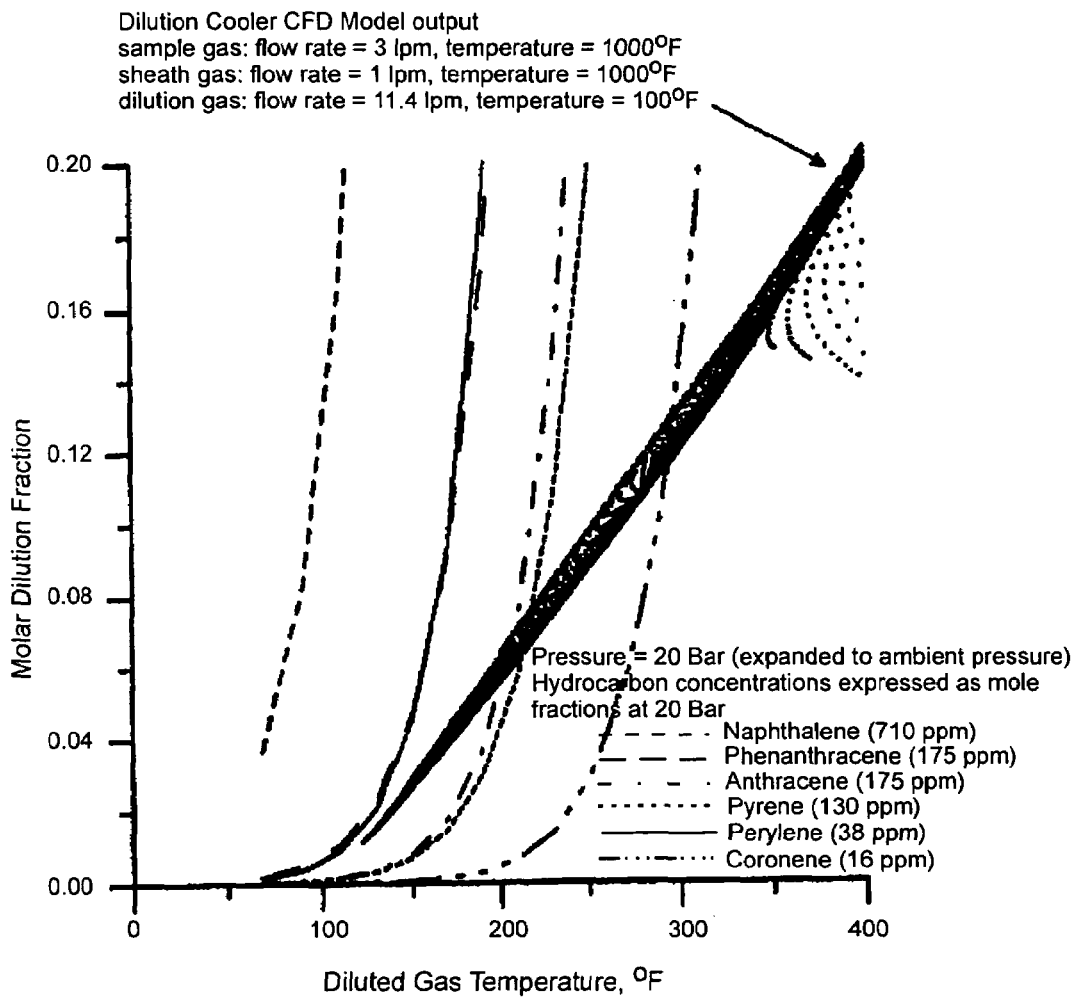
FIG. 5 is a diagram showing the output from the dilution cooler CFD model matched with expected condensation behavior to define an operational envelope for the dilution cooler within which condensation will not occur for a variety of hydrocarbon species in accordance with one embodiment of this invention.

When these model results are combined with the condensation properties of a number of hydrocarbon species usually found in biomass-derived synthesis gas, then those locations within the dilution cooler where condensation can take place can be determined. FIG. 4 shows plots of condensation equilibria for benzene, naphthalene, phenanthrene, anthracene, pyrene, perylene, and coronene expressed as a function of molar dilution fraction and temperature for a syngas initially at 20 Bar and 1000° F. containing concentrations of these compounds typical for syngas produced When the dilution and cooling of biomass-derived synthesis gas is carefully controlled in a dilution cooler that incorporates the design considerations presented above, and when a robust CFD model is used to determine the precise levels of dilution that are obtained within the mixing zone of this device, the Clausius-Clapeyron equation can be used to predict those points where condensation will occur within the mixing zone. FIG. 5 combines FIGS. 3 and 4 over a range of dilutions and temperatures where condensation can occur that can be used to define an operating envelope within which condensation can be avoided. Inspection of FIG. 4 shows that if the dilution cooler is maintained at the operating conditions listed herein above, coronene, perylene, and anthracene will all condense within the dilution cooler whereas benzene, naphthalene, phenanthracene will remain as a vapor at the dilution cooler exit.

This invention integrates four components into a system for avoiding condensation when syngas is extracted from a high temperature and/or high pressure process. First, there is pressure letdown through a coated, inert orifice. This is followed by dilution and cooling in a specialized dilution cooler. The dilution cooler has been robustly modeled so that if the approximate concentration of the syngas that enters the dilution cooler is known, the Clausius-Clapeyron equation can be used, as shown above, to determine the molar dilution ratio below which condensation will occur so that at the outlet of this device hydrocarbons (and moisture) present in the diluted and cooled gas can be passed to gas measurement equipment without fear of condensation.

In practice, a very high initial dilution ratio is chosen (to avoid any condensation) with a dilution cooler exit temperature as low as is practicable. Then on-line real-time gas analyzers are used to provide an initial assessment of the concentration of moisture and hydrocarbon species present in the highly diluted gas. Next, using information from a database of operational configurations for the dilution cooler, developed over repeated applications of the CFD model with realistic concentrations of syngas, a safe, lower molar dilution fraction and dilution cooler exit temperature can be chosen. The dilution ratio is then decreased from a very high value to lower and lower values while the outlet temperature is adjusted to avoid condensation. Throughout this process, the database that defines the operational envelope of the dilution cooler is queried and the instantaneous concentrations of the various hydrocarbon species are used as input to the Clausius-Clapeyron equation to assure that condensation is not approached within the dilution cooler for all of the hydrocarbon species measured, along with moisture. This procedure can be automated, incorporating feedback from the database of dilution cooler performance and estimates of the nearness of condensation provided by real-time measurements of hydrocarbon concentration that are used as input to the Clausius-Clapeyron equation.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for diluting a heated, pressurized gas sample comprising at least one condensable component, the method comprising the steps of:
    decompressing said heated, pressurized gas sample, forming a depressurized heated gas sample;
    determining a concentration of said at least one condensable component in said depressurized heated gas sample;
    determining a minimum dilution ratio at a predetermined gas sample temperature at which condensation of said at least one condensable component is precluded;
    introducing said depressurized gas sample and a heated inert gas separately through a coaxial nozzle into a mixing zone of a dilution cooler chamber having a gas sample/inert gas inlet and a dilute sample gas outlet, said mixing zone formed by a porous conduit disposed within said dilution cooler chamber providing fluid communication between said gas sample/inert gas inlet and said dilute sample gas outlet; and
    introducing an inert dilution gas into said mixing zone in an amount sufficient to achieve said minimum dilution ratio, forming a dilute gas sample.

2. A method in accordance with claim 1, wherein said heated, pressurized gas sample is a syngas output from a gasification process.

3. A method in accordance with claim 1, wherein said inert gas is selected from the group consisting of nitrogen, argon, neon, helium, krypton, xenon, and mixtures thereof.

4. A method in accordance with claim 1, wherein said minimum dilution ratio is determined with a computational flow dynamic model for said dilution cooler chamber.

5. A method in accordance with claim 1, wherein said inert dilution gas is introduced into said mixing zone through a second porous conduit disposed within said dilution cooler chamber.

6. A method in accordance with claim 1, wherein said depressurized gas sample and said heated inert gas are at a substantially identical temperature.

* * * * *